(12) United States Patent
Metcalf, III (10) Patent No.: US 6,842,454 B2
(45) Date of Patent: Jan. 11, 2005

(54) METHOD AND SYSTEM FOR DEVICE ADDRESSING ON A COMPUTER NETWORK

(75) Inventor: Orlando P. Metcalf, III, North Andover, MA (US)

(73) Assignee: Schneider Automation Inc., North Andover, MA (US)

( * ) Notice: Subject to any disclaimer, the term of this patent is extended or adjusted under 35 U.S.C. 154(b) by 868 days.

(21) Appl. No.: 09/808,547

(22) Filed: Mar. 14, 2001

(65) Prior Publication Data

US 2002/0131446 A1 Sep. 19, 2002

(51) Int. Cl.[7] .................................................. H04J 3/16
(52) U.S. Cl. ....................... 370/392; 370/401; 370/466
(58) Field of Search ................................ 370/401, 389, 370/392, 466

(56) References Cited

U.S. PATENT DOCUMENTS

| | | | |
|---|---|---|---|
| 5,430,727 A | * | 7/1995 | Callon .......................... 370/401 |
| 5,699,350 A | | 12/1997 | Kraslavsky |
| 5,805,442 A | | 9/1998 | Crater et al. |
| 5,862,391 A | | 1/1999 | Broadnax et al. |
| 6,151,625 A | | 11/2000 | Swales |
| 6,188,689 B1 | | 2/2001 | Katsube et al. |
| 6,189,062 B1 | | 2/2001 | Solomon et al. |
| 6,233,626 B1 | | 5/2001 | Swales |
| 6,282,454 B1 | | 8/2001 | Papadopoulos et al. |
| 6,434,157 B1 | | 8/2002 | Dube |
| 6,553,000 B1 | * | 4/2003 | Ganesh et al. ............... 370/235 |
| 6,618,377 B1 | * | 9/2003 | Miriyala ..................... 370/395.1 |
| 6,629,149 B1 | * | 9/2003 | Fraser et al. ................. 709/245 |
| 6,708,219 B1 | * | 3/2004 | Borella et al. ............... 709/245 |
| 6,788,647 B1 | * | 9/2004 | Mohaban et al. ............ 370/235 |

OTHER PUBLICATIONS

U.S. patent application Ser. No. 09/167,251, Papadopoulos, filed Oct. 6, 1998.
www.modbus.org/accessed Dec. 20, 2000, pp. 1–2.
www.modicon.com/openmbus/source/sources. pp. 1,2.
Modbus Plus Network Planning and Installation Guide, 890 USE 100 0 version 3.0 Schneider Electric. Apr. 1996, pp. 186,187,188,189,190,191 pages continued 192,193.

* cited by examiner

Primary Examiner—Chau Nguyen
Assistant Examiner—Richard Chang (57) ABSTRACT

A method, system, and computer program product for communicating information over a communications network from a sending device to a target device is disclosed. The sending device determines a network location of a target device to which a first frame of information is to be sent. The first frame of information is formatted for a first communications protocol and includes a device address field configured to store a device identifier that corresponds to the target device. Then the sending device selects, based on the network location of the target device, an addressing scheme from among plural different addressing schemes. The device identifier is generated for the first frame on the basis of the selected addressing scheme. The sending device encapsulates the first frame of information in a second frame of information formatted for a second communications protocol and including a destination address field. Then the sending device generates a destination address for the second frame on the basis of the device identifier in the device address field of the first frame, stores the destination address in the destination address field of the second frame, and transmits the second frame of information over the communications network.

40 Claims, 7 Drawing Sheets

METHOD AND SYSTEM FOR DEVICE ADDRESSING ON A COMPUTER NETWORK

FIELD OF THE INVENTION

The present invention relates to a method, system, and computer program product for communicating information over a communications network, and more particularly to an addressing scheme for devices on a computer network.

BACKGROUND OF THE INVENTION

Ethernet-based products for factory automation and related fields are widely used for communicating between data processing systems and peripheral devices. Local area networks (LANs) interconnect factory equipment and other devices such as programmable logic controllers (PLCs), bridges (e.g., the BP85 Bridge Plus and BM85 Bridge Multiplexer by Schneider Automation, Inc.), industrial power monitors (e.g., the CM 4000 by Schneider Electric N.A.), programmable logic controllers (PLCs) (e.g., any of the Quantum PLCs by Schneider Automatoin, Inc.), and computer work stations for monitoring and programming PLCs and other devices related to factory automation The MODBUS protocol is widely used for factory automation applications. The MODBUS protocol is described in the "MODBUS Protocol Reference Guide," publication PI-MBUS-300 by Schneider Automation, Inc., which is incorporated herein by reference. MODBUS Plus is a LAN protocol for industrial control applications. Applications of the MODBUS Plus protocol are described in the "MODBUS Plus Network Planning and Installation Guide," 890 USE 100 00 Version 3.0, Schneider Electric, April 1996, which is incorporated herein by reference.

The MODBUS protocol is well known and is described, for example, on the World Wide Web (Web) at http://www.modicon.com/techpubs/toc7.html, which is incorporated herein by reference along with all related Web pages.

The emergence of Ethernet as the de facto standard of corporate enterprise systems has led to the use of Ethernet in factory networking. This, in turn, has led to the development of MODBUS/TCP which combines Ethernet, TCP/IP (transmission control protocol/internet protocol), and MODBUS messaging to achieve scalable networks for factory automation equipment, using these well-known protocols and specifications. The MODBUS/TCP protocol is described in Swales, "Open MODBUS/TCP Specification," Release 1.0, Mar. 29, 1999, which is incorporated herein by reference. Sample source code for a MODBUS/TCP driver and Swales, "Open MODBUS/TCP Specification" is available on the Web at http://www.modicon.com/openmbus, which is incorporated herein by reference along with all related Web pages. The MODBUS protocol is described on the Web at http://www.modicon.com/techpubs/intr7.html, which is incorporated herein by reference along with all related Web pages. Different networking schemes relating to factory automation are described in U.S. Pat. Nos. 6,151,625; 5,805,442; 5,251,302; and 5,699,350, which are incorporated herein by reference.

A MODBUS frame includes an address field for storing a device identifier (ID). The device ID identifies the slave device to which the MODBUS frame is to be sent when the message is being sent from a master device. When the frame originates at a slave device and is to be sent to a master device, the device ID identifies the slave device from which the MODBUS frame is sent. Thus, a master addresses a slave by placing the slave address in the address field of the message, and when the slave sends its response, it places its own address in the address field to let the master know which slave is responding.

Although MODBUS/TCP has facilitated internetworking of factory automation devices, there are significant restraints on the addressing scheme used by MODBUS/TCP. Presently, both ends of a MODBUS/TCP connection are manually configured such that every MODBUS master device has a look-up table of destination IP addresses for every possible MODBUS device ID value. In many cases, the look-up tables in the MODBUS master devices are identical, and thus, redundant. The tables require updating by an engineer or skilled labor. Devices may change address without notice. The tables become outdated and the operator receives an error message as notification to update a table—an inefficient and awkward error messaging system. As the industry moves toward interoperatability, that is, seamless data transfer between data transfer protocols the number of third party devices requiring addressing increase, further increasing maintenance and complexity in addressing schemes.

SUMMARY OF THE INVENTION

A method, system, and computer program product for communicating information over a communications network from a sending device to a target device is disclosed. The sending device determines a network location of a target device to which a first frame of information is to be sent. The first frame of information is formatted for a first communications protocol and includes a device address field configured to store a device identifier that corresponds to the target device. Then the sending device selects, based on the network location of the target device, an addressing scheme from among plural different addressing schemes. The device identifier is generated for the first frame on the basis of the selected addressing scheme. The sending device encapsulates the first frame of information in a second frame of information formatted for a second communications protocol and including a destination address field. Then the sending device generates a destination address for the second frame on the basis of the device identifier in the device address field of the first frame, stores the destination address in the destination address field of the second frame, and transmits the second frame of information over the communications network.

Thus, the present invention provides additional flexibility to the addressing scheme used in communications networks where a frame of information formatted for one protocol is embedded in a frame of information formatted for another protocol. In one embodiment, the device ID is stored in the address field of a MODBUS frame and the destination address is the destination internet protocol (IP) address in an IP packet. Different protocols, such as ATM (asynchronous transfer mode), may be used in alternative embodiments. Additionally, the present invention makes it possible for a device to automatically generate a destination IP address of another device based only on information contained in a MODBUS message.

In one embodiment, three different addressing schemes are available for each MODBUS frame. With the first scheme, the device ID of the target device (i.e., the device to which the MODBUS frame is being sent) is from 1 to 64, and the destination IP address is formed by replacing the last octet of the IP address of the sending device with the device ID of the target device.

In the second addressing scheme, the device ID of the target device is in the range 70 to 99. The device ID is determined from the entry in an address table that corresponds to the IP address and device ID of the target device. In a preferred embodiment, the lookup table has 30 entries, corresponding to the 30 possible device IDs in the range 70 to 99.

The third addressing scheme is used for device IDs in the range 100 to 247. The device ID of the target device is formed by multiplying a first level address of the target device by a predetermined constant. The resulting product is added to the second level address of the target device to form the device ID. This advantageously permits two levels of addressing. This is particularly useful when a device with a unique IP address has several peripherals with non-unique addresses. For example, in one embodiment the first level address identifies the port of a subnet gateway and the second level address identifies the target device on the subnet. Conventional MODBUS/TCP cannot address different devices connected to the same port of a subnet gateway, such as a bridge multiplexer. One embodiment of the present invention conveniently provides this capability by identifying the port of a subnet gateway with the quotient resulting when the device ID is divided by a constant, and by identifying the target device on the subnet with the remainder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
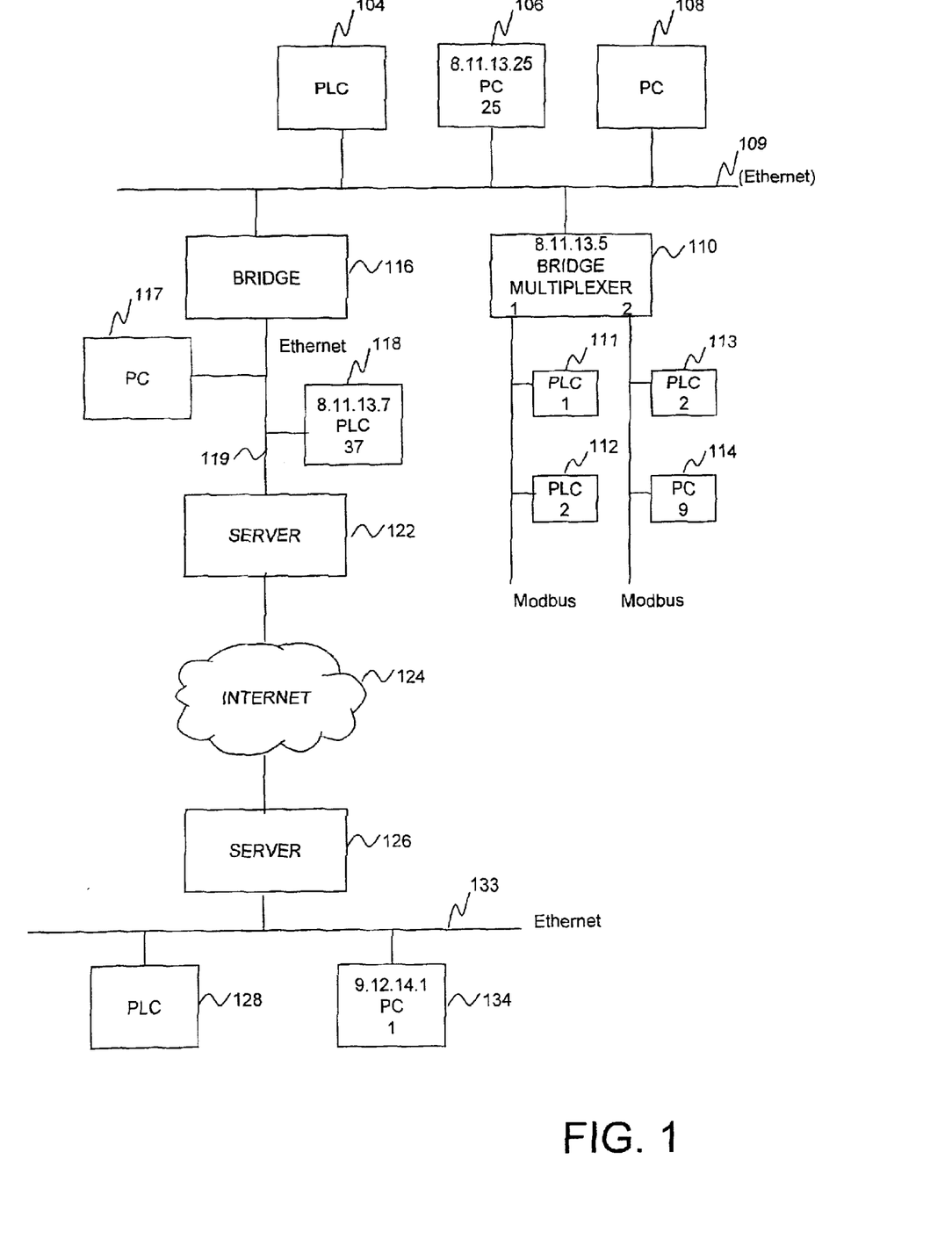
FIG. 1 is a schematic illustration of an exemplary communications network employing one or more variations of the inventive addressing scheme of the present invention.

Referring now to the drawings, wherein like reference numerals designate identical or corresponding parts throughout the several views, and more particularly to FIG. 1 thereof, a portion of an exemplary communications network is shown. The network includes devices such as programmable logic controller (PLC) 104, personal computer (PC) 106, PC 108, bridge multiplexer 110, and bridge 116, which are in communication with one another over bus 109 and form a portion of a LAN. Coupled to ports 1 and 2 of the bridge multiplexer 110 are PLCs 111, 112, and 113 and PC 114, forming two subnets, respectively, on ports 1 and 2 of bridge multiplexer 110. Bridge 116, PC 117, PLC 118, and server 122 form a portion of another LAN connected to the network of FIG. 1 and communicate with one another over bus 119. Servers 122 and 126 communicate with one another over the Internet 124. Server 126, PLC 128, and PC 134 communicate with one another over bus 133 and form a portion of another LAN.

Figure 7:
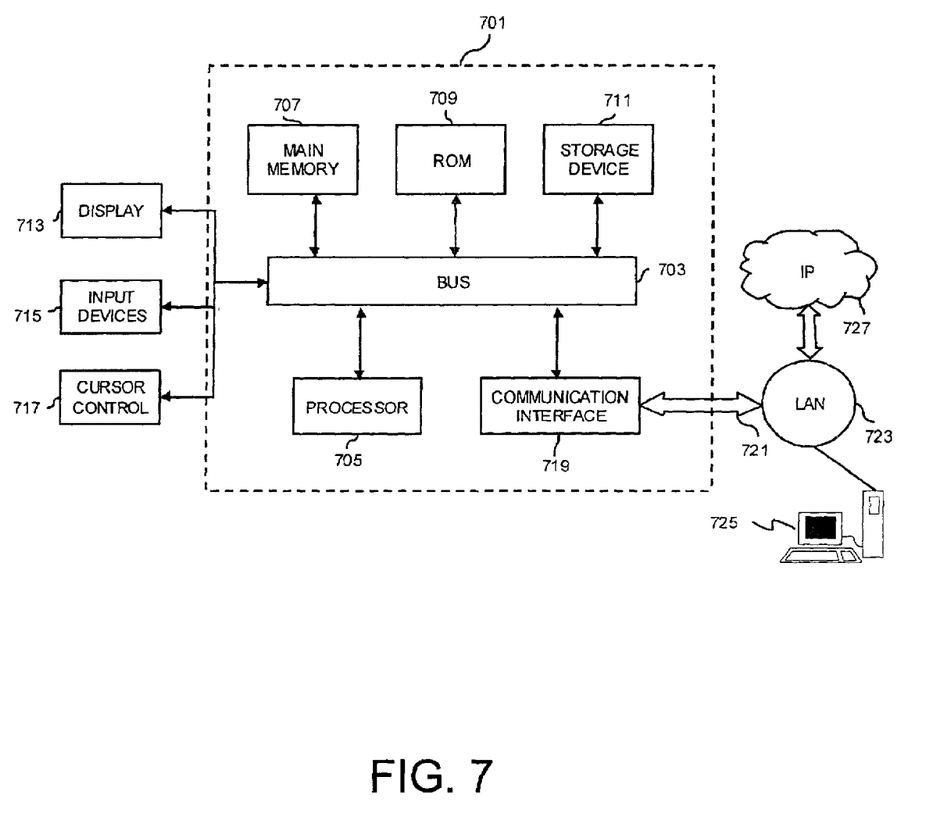
FIG. 7 is a schematic illustration of a general purpose computer system configured to perform one or more of the special purpose functions of the present invention.

PLCs 104, 111, 112, 113, 118, and 128 are any known PLCs for factory automation and/or machine control and monitoring, such as Schneider Automation's Quantum, Premium, or Momentum product lines PCs 106, 108, 114, 117, and 134 are any suitable workstation, personal computer, laptop computer, palmtop computer, personal data assistant, and/or the computer system 701 of FIG. 7, for example. The PCs 106, 108, 114, 117, and 134 provide all or some of the functions of a user interface, monitoring equipment, or ladder logic control or any other function that computers provide for factory automation systems. For example, the PC 108 may provide a user interface that permits a user to monitor, control, program, and provide other factory automation functions for PLCs 104, 111, 112, 113, 118, and 128, for example. As another example, PC 134 could be configured to program PLC 118 and monitor PLC 104. As another example, the PC 106 could be a programming panel, such as a P230 Programming Panel by Schneider Automation, Inc. Appropriate software tools and programming techniques are well-known in the art for monitoring, programming, and controlling PLCs, such as Concept Programming software by Schneider Automation, Inc.

Bridge multiplexer 110 is any suitable device for connecting one or more subnets to another network. Bridge multiplexer 110 provides a subnet gateway to the subnet on port 1 and to the subnet on port 2. In this case, the bridge multiplexer 110 connects a subnet formed by PLC 111 and PLC 112 and another subnet formed by PLC 113 and PC 114 to the network of devices (including PLC 104, PC 106, and PC 108) connected to the bus 109. In one embodiment, the bridge multiplexer 110 also performs the functions of a router. The bridge multiplexer 110 connects subnets to networks that use the same or different protocols as the subnets. An example of a suitable bridge multiplexer 110 is the BM85 Bridge Multiplexer by Schneider Automation Inc. The BM85 bridge multiplexer connects MODBUS devices or subnets of MODBUS devices to MODBUS Plus networks. The two ports, labeled 1 and 2, can be separately configured to support a MODBUS master device, slave device, or network of slave devices, for example. The port parameters are separately configurable. Further, the bridge multiplexer 110 may be used for either single-cable or dual-cable network layouts, for example. In one embodiment, ports 1 and 2 of the bridge multiplexer 110 are configured for RS422 or RS485 serial devices. The RS422 protocol supports up to 16 devices on a subnet, and the RS485 supports up to 32 devices on a subnet.

In one embodiment, the devices in FIG. 1 connected to buses 109, 119, and 133 communicate using MODBUS/TCP protocol, although any other suitable protocols may be used. The buses 109, 119, and 133 transfer data among the devices of FIG. 1. Additionally, the buses 109, 199, and 133 are representative of connections between the various devices and thus any network topology (e.g., bus, ring, or star) may be used with the present invention. For purposes of demonstration, the PC 106 has an IP address of 8.11.13.25 and a device ID of 25, the bridge multiplexer 110 has an IP address of 8.11.13.5, the PLC 118 has an IP address of 8.11.13.37 and a device ID of 37, and the PC 134 has an IP address of 9.12.14.1, and a device ID of 1. Additionally, PLC 111 has a device address of 1, PLC 112 has a device address of 2, PLC 113 has a device address of 2, and PC 114 has a device address of 9, as shown in FIG. 1.

The server 122 and the server 126 provide interfaces between the networks connected by bus 119 and bus 133, respectively, and the Internet 124. Servers 122 and 126 are any computers, workstations, server computers, computer system (e.g., the computer system 701 of FIG. 7) or any other device and/or software for controlling their respective local networks or responding to commands from Internet clients, for example. Examples of server hardware include GEC Alpha and Sun UltraSPARC Servers.

Bridge 116 is any suitable device for connecting networks. In the example shown in FIG. 1, the bridge 116 connects a network of devices connected to bus 109 to a network of devices connected to bus 119. An example of a suitable bridge 116 is the BP85 Bridge Plus by Schneider Automation Inc.

The Internet 117 is a wide area network (WAN) that includes gateways and networks that use TCP/IP protocols. Servers 122 and 126 communicate with each other over the Internet 124, for example. In alternative embodiments, any suitable private or public network for connecting remote computers is used in place of, or in addition to, the Internet 124.

Figure 2A:
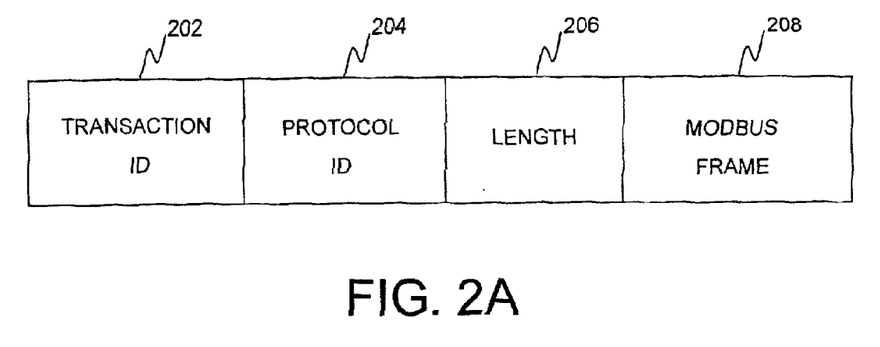
FIG. 2A is a schematic illustration of a TCP frame configured in accordance with one embodiment of the present invention.

FIG. 2A is a schematic illustration of a TCP frame that includes a transaction ID field 202, a protocol ID field 204, a length field 206, and an information field 208 for encapsulating information such as MODBUS frame. It is to be understood that the terms packet, frame, block, and segment are used interchangeably herein. The transaction ID field 202 stores information identifying a particular transaction between two devices. The protocol ID field 204 stores information identifying the protocol of the message encapsulated in the TCP frame. For example, a protocol ID 204 value of 0 indicates that the TCP frame is delivering a message formatted for the MODBUS protocol. The length field 206 identifies the length of the encapsulated message in field 208. The field 208 stores the message, in this example, a MODBUS frame encapsulated in the TCP frame of FIG. 2A.

Figure 2B:
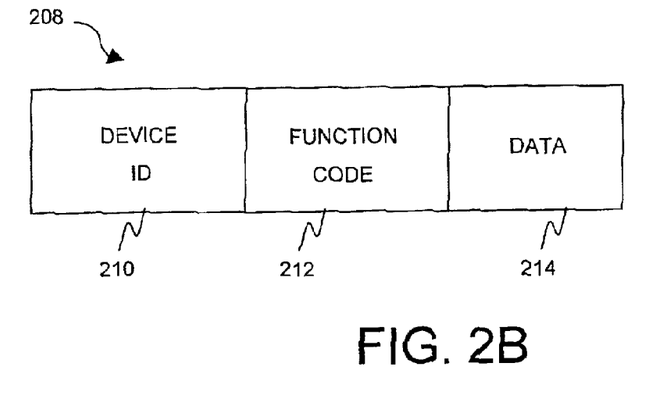
FIG. 2B is a schematic illustration of a MODBUS frame configured in accordance with an embodiment of the present invention.

FIG. 2B is a schematic illustration of the MODBUS frame in the field 208. The MODBUS frame includes a device ID field 210, a function code field 212, and a data field 214. The device ID field 210 stores information identifying a slave device to which a MODBUS message is sent or from which a MODBUS message is received. The function code field 212 stores information that instructs a slave as to what kind of action it is to perform. For example, the function code 212 could store information instructing a slave device to read the on/off states of a group of discrete coils or inputs, to read the data contents of a group of registers, to read the diagnostic status of the slave, to write to designated coils or registers, or to allow loading, recording, or verification of a program within the slave device. When a slave sends a MODBUS message to a master device, it uses the function code field 212 to indicate either a normal (i.e., error-free) response or that an error occurred (i.e., an exception response). For a normal response, the slave device simply echoes the original function code. For an exception response, the slave device returns a function code that is equivalent to the original function code with its most significant bits set to a logic value of 1. In the MODBUS protocol, the data field is constructed using sets of two hexadecimal digits, in the range of 00 to FF hexadecimal. Thus, the data field 214 can be constructed from a pair of ASCII characters or from a single RTU character, according to the network's serial transmission mode. The data field 214 typically contains additional information which a slave device uses to take the action defined in the function code field 212. Such information includes the address of registers, the quantity of items to be handled, and the number of actual data bytes in the data field 214. According to one embodiment of the present invention, a MODBUS frame (e.g., the MODBUS frame 208) is encapsulated in a TCP frame (e.g., the TCP frame of FIG. 2A). The TCP frame is encapsulated in an IP frame, which is embedded in an Ethernet packet. According to this embodiment, either the device ID field 210 or the destination address of the IP packet is altered, depending on the location of the target device which is to receive the MODBUS message. Accordingly, the present invention uses different addressing schemes for different IP packets and MODBUS frames, based on the location of the target device on the network. For exemplary purposes, the present invention is described as being used in conjunction with MODBUS/TCP protocol.

Figure 3:
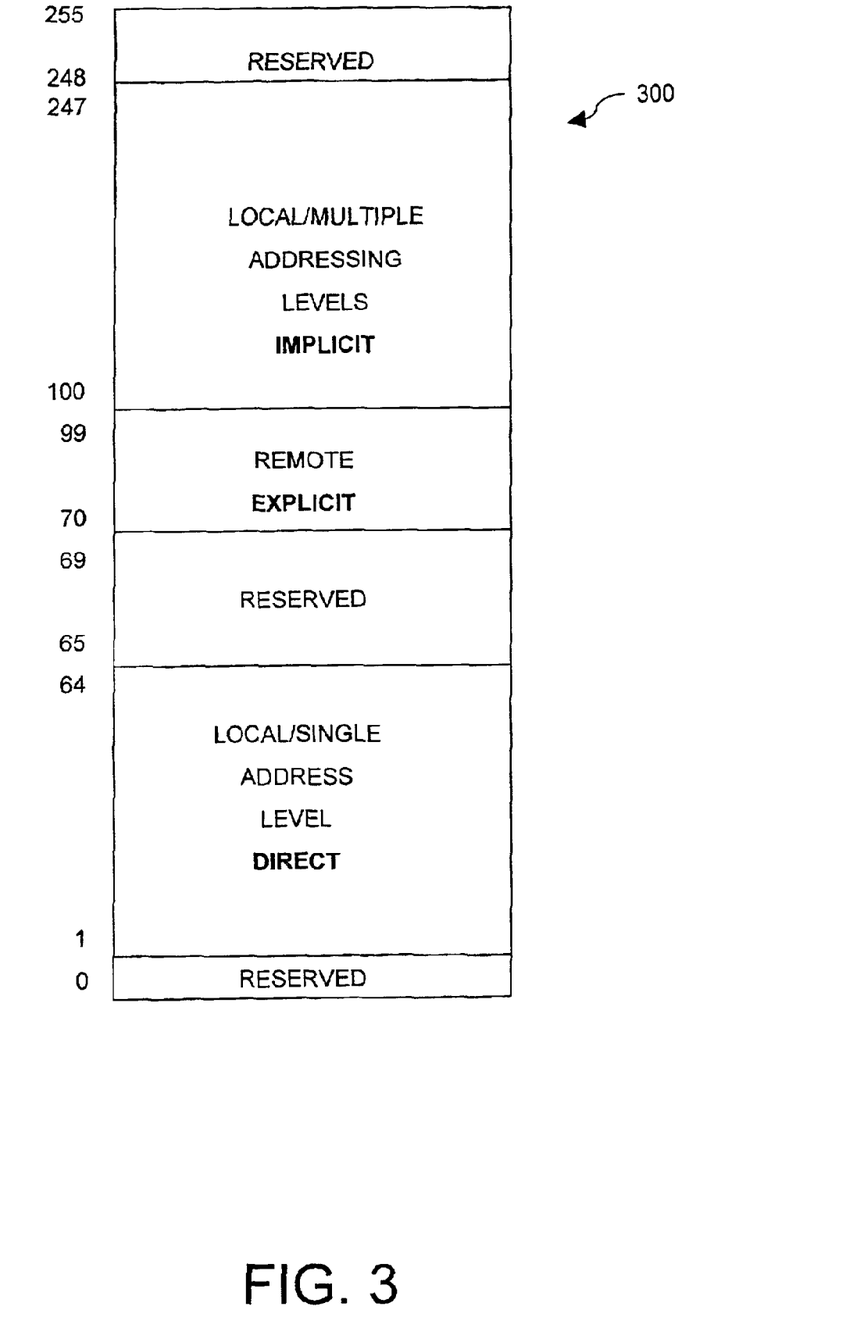
FIG. 3 is a conceptual illustration of the device ID ranges for the device ID field of a MODBUS frame according to one embodiment.

FIG. 3 is a conceptual illustration of the range of values that the device ID in the device ID field 210 can take. In this example, the device ID is a numerical value in the range 0 to 255.

The device of IDs in the range 0, 65–69, and 248–255 are reserved in this example. Device IDs in the range 1–64 are used when the target device is local to the sending device that sends the MODBUS message to the target device. The target device is considered local to the sending device if the target device resides on the same LAN as the sending device or resides on a LAN that is connected by a network bridge (e.g., the bridge 116) to the LAN on which the sending device resides. Thus, PC 108 and PLC 118, for example, might be considered local to one another for purposes of the present invention, even though they reside on different LANs, as explained below.

Device IDs in the range 70–99 are used when the target device is on a remote network. In one embodiment, a target device is considered to be on a remote network if any of the first three bytes of the IP address (i.e., the first three octets) of the target device are not the same as the sending device. An alternate embodiment, the target device and the sending device are considered to be on the same Class B network if they have only the first or second byte of the IP address in common. For this example, it is assumed that the addresses are in IPv4 (IP version 4) format or an Ipv4-compatible format; however, one having ordinary skill in the art will readily be able to tailor the present invention to different addressing schemes, such as IPv6 (IP version 6).

Thus, in the example of FIG. 1 PLC 118 has an IP address of 8.11.13.37, PC 106 has an IP address of 8.11.13.25, and PC 134 has an IP address of 9.12.14.1. Therefore, if two devices are considered to be on the same network when the first three bytes of their IP addresses are the same, then PLC 118 and PC 106 are on the same network and PC 133 is on a different network than PC 106 and PLC 118, for purposes of determining a device ID.

Referring back to FIG. 3, device IDs in the range 100–247 are used to identify devices on a subnet or that otherwise require multiple levels of addressing. In the example of FIG.

1, PLC 111, PLC 112, PLC 113, and PC 114 have subnet addresses of 1, 2, 2, and 9, respectively. Since these devices are not uniquely addressed, two levels of addressing are required. The first level of addressing is the port number on the bridge multiplexer 110 (i.e., 1 or 2 in this example). The second level of addressing is the subnet address of the devices. Thus, the PLC 113 is identified as being on port 2 of the bridge multiplexer 110 and having a subnet or device address of 2, and the PLC 112 is identified as being on port 1 of the bridge multiplexer 110 and having a subnet address of 2. According to one embodiment, the device IDs in the range of 100–247 are used in the following manner. The port number of the target device is multiplied by a constant and the subnet or device address of the target device is added to the resulting product. For example, if the constant is 100, then a MODBUS message sent to PLC 112 would have a device ID of 102 (port=1, device ID=2), and a MODBUS message sent to PLC 113 would have a device ID of 202 (port=2, device ID=2).

Figure 4:
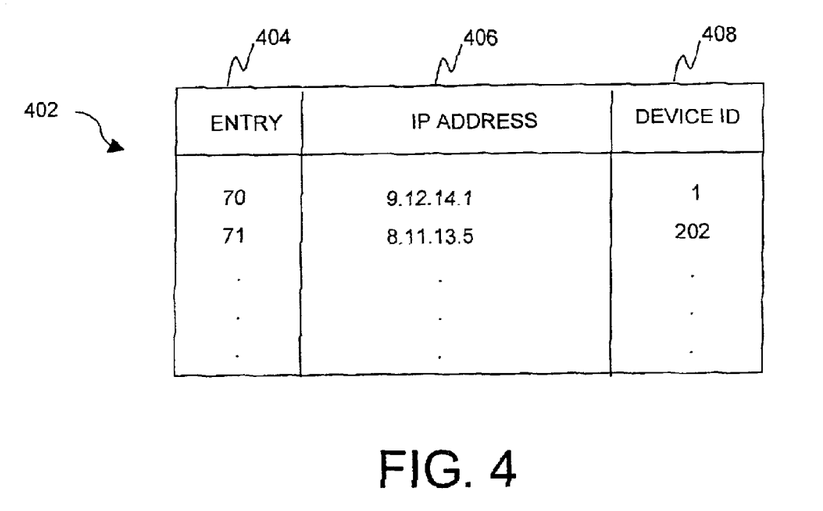
FIG. 4 is an exemplary address table in which each entry uniquely identifies a target device by an IP address and a device ID in accordance with an embodiment of the present invention.

FIG. 4 is an address table for determining the device ID of a MODBUS message sent to a remote target device. Address table 402 includes an entry field 404 for storing entries 70–99, corresponding to the range of possible device IDs for remote target devices in the exemplary address ranges shown in FIG. 3. The IP address field 406 stores IP addresses for the possible target devices. The device ID field 408 stores the device ID of the target device. Devices that are not on a subnet are normally uniquely identified by their IP address and their device ID. For example, entry 70 identifies PC 134, which has an IP address of 9.12.14.1 and a device ID of 1. When the target device is on a subnet, the value in the device ID field 408 identifies the device on the subnet. For example, if a MODBUS message is to be sent to PLC 113, the MODBUS message will have a device ID of 71 since the record in the address table 402 that corresponds to entry 71 has an IP address of 8.11.13.5 (identifying bridge multiplexer 110) and a device ID of 202 (identifying PLC 113, which has a subnet address of 2 and is on port 2 of the bridge multiplexer 110, assuming that a constant value of 100 is again used to determine the two-level address)). According to one embodiment, the address table 402 is manually configured and resides on each MODBUS master device. It should also be noted that the address table 402 could be used to address local devices. For example, if the addressing scheme of FIG. 3 is used and there are already 64 local devices on a network, then extra local devices could be addressed using the address table 402 and device IDs in the range 70–99.

Figure 5A:
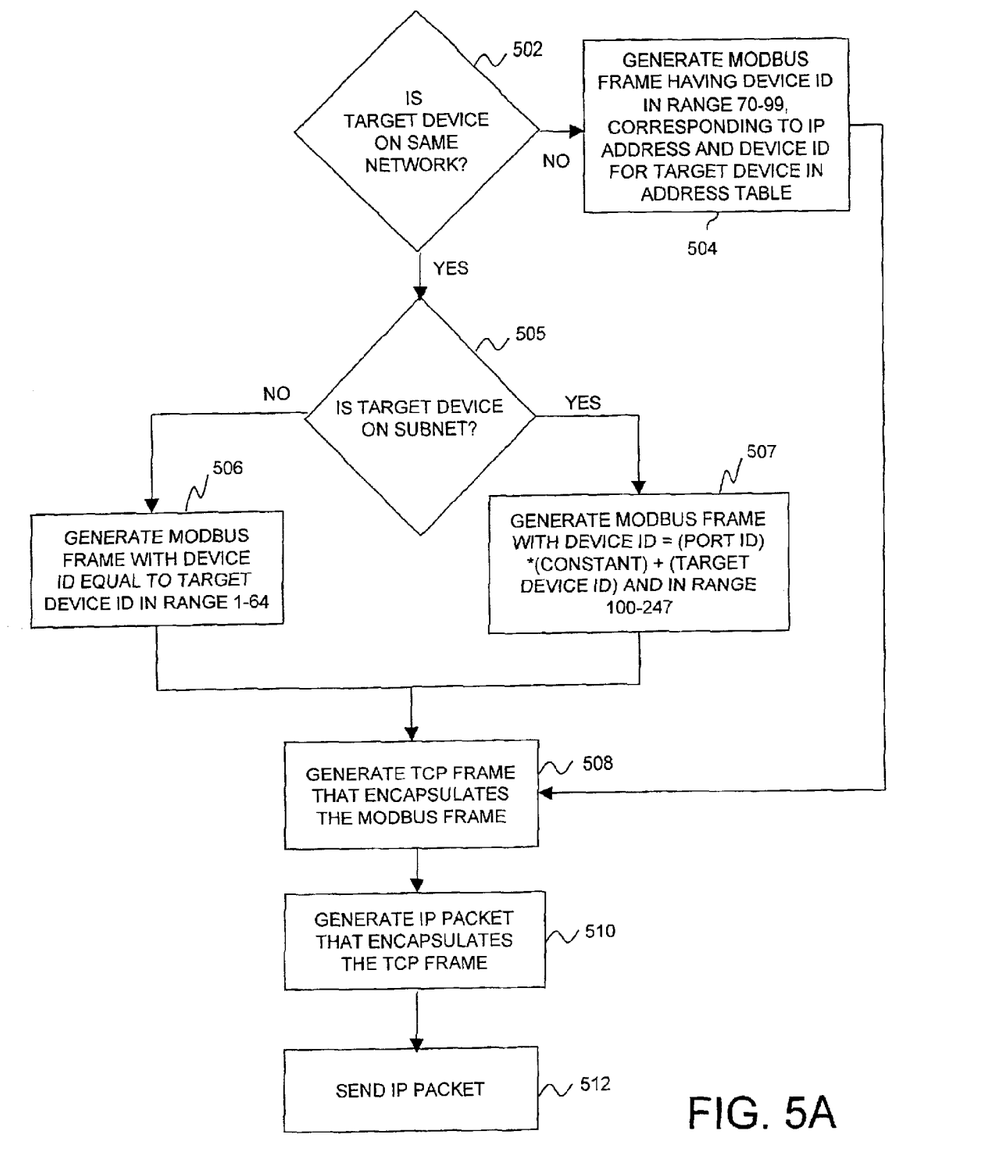
FIGS. 5A and 5B are flowcharts explaining how the present invention uses different addressing schemes based on the network location of a target device, according to one embodiment.

FIG. 5A is a flowchart for explaining how MODBUS messages and IP packets are generated according to the present invention. In step 502, the sending device determines whether the target device is on the same network as the sending device, as described above with reference to FIG. 3 (for example, by determining if the first three octets of the IP address of the sending and target devices are the same). If the target device is not on the same network as the sending device, then in step 504 the target device generates a MODBUS frame having a device ID in the range 70–99 by looking in the address table 402 to find the device ID in the entry field 404 that corresponds to the IP address (in field 406) and device ID (in field 408) of the target device. The sending device sets the device ID of the MODBUS frame equal to the device ID in the entry field 404 that corresponds to the target device. Then, in step 508 the sending device generates a TCP frame that encapsulates the MODBUS frame.

If, in step 502, the sending device determines that the target device is on the same network, then in step 505 the sending device determines whether the target device is on a subnet (or whether multiple levels of addressing are required). If the target device is not on a subnet, then in step 506 the sending device generates a MODBUS frame with the device ID equal to the target device ID in the range 1–64. For example, if the PC 106 wishes to read a register of the PLC 118, then the PC 106 generates a MODBUS frame with a device ID of 37. Thus, the addressing scheme of step 506 is used when the device ID of the target device is between 1 and 64 if the exemplary device ID ranges of FIG. 3 are used. Then, in step 508 the sending device generates a TCP frame that encapsulates the generated MODBUS frame.

If, in step 505, the sending device determines that the target device is on a subnet, then multiple levels of addressing are used to identify the target device on the subnet. In step 507 the sending device generates a MODBUS frame and determines the device ID by multiplying the port ID of the target device by a constant and adding the device ID of the target device so that the resulting device ID is in the range 100–247 in accordance with the exemplary ranges shows in FIG. 3. Then, in step 508 the sending device generates a TCP frame that encapsulates the MODBUS frame.

In step 510 the sending device generates an IP packet that encapsulates the TCP frame. Then, in step 512 the sending device sends the IP packet over the network. If the network is using Ethernet protocol, then the IP packet is sent over the network encapsulated in an Ethernet frame.

Figure 5B:
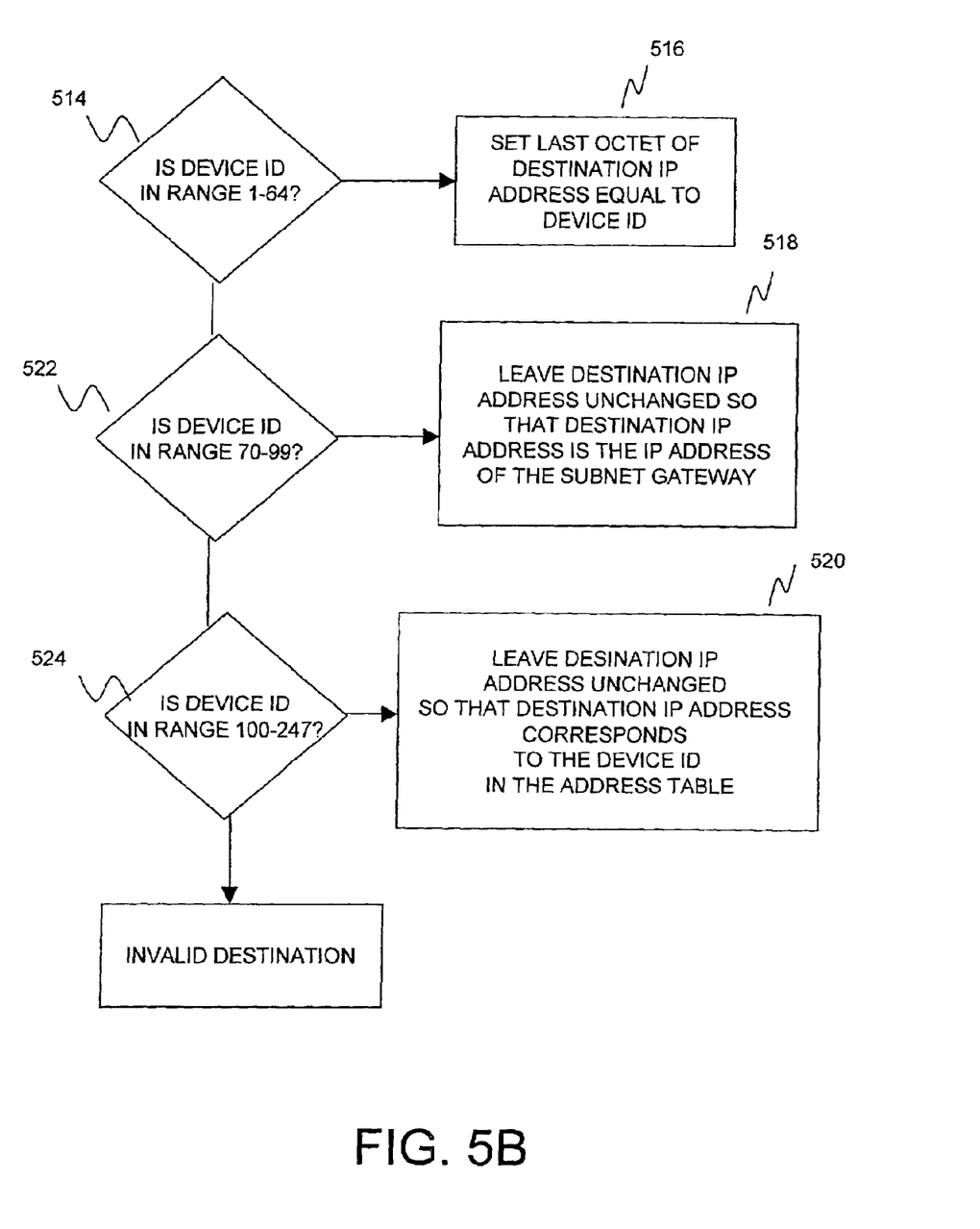

FIG. 5B is a flowchart for explaining in further detail the generation of the IP packet in step 510 of FIG. 5A. In step 514 the sending device determines whether the device ID of the MODBUS frame is in the range 1–64 (whether the target device is local). If the device ID of the MODBUS frame is in the range 1–64, then in step 516 the sending device sets the last octet (i.e., last byte) of the destination IP address equal to the device ID. Note that if the sending device and the target device are determined to be local (i.e., not on a remote network) in step 502 on the basis of their having in common the first three octets of their IP addresses, then step 516 is the same as setting the destination IP address equal to the sender's IP address with the last octet set equal to the device ID. Thus, if PC 106 sends a MODBUS message to PLC 118, then the device ID for the MODBUS message will be 37, corresponding to the device ID of PLC 118. To form the destination IP address the PC 106 recognizes that the device ID is in the range 1–64 and forms the destination IP address by substituting 37 for the last octet of its own IP address, 8.11.13.25, resulting in a destination IP address of 8.11.13.37.

If, in step 522, the sending device determines that the device ID is in the range 70–99 (whether the target device is remote), then the destination IP address is unchanged. Thus, if the device ID is in the range of 70–99, then in step 518 the destination IP address is unchanged so that the destination IP address is the IP address in the field 406 that corresponds to the device ID in the field 404 of the address table 402. For example, if PC 134 sends a MODBUS message to PLC 113, then the IP address would remain 8.11.13.5, identifying the bridge multiplexer 110. In this example, the device ID of the MODBUS message would be 71, based on the exemplary entries in table 402 of FIG. 4. If, in step 524, the device ID is in the range 100–247 (whether the target device is on a subnet), then in step 520 the destination IP address is the IP address of the subnet gateway. Therefore, if the PC 106 sends a MODBUS message to PC 111, then the destination IP address would be 8.11.13.5. If the device ID is not in a range of 1–64, 70–99 or 100–247 then the device ID is an invalid destination address.

Figure 6:
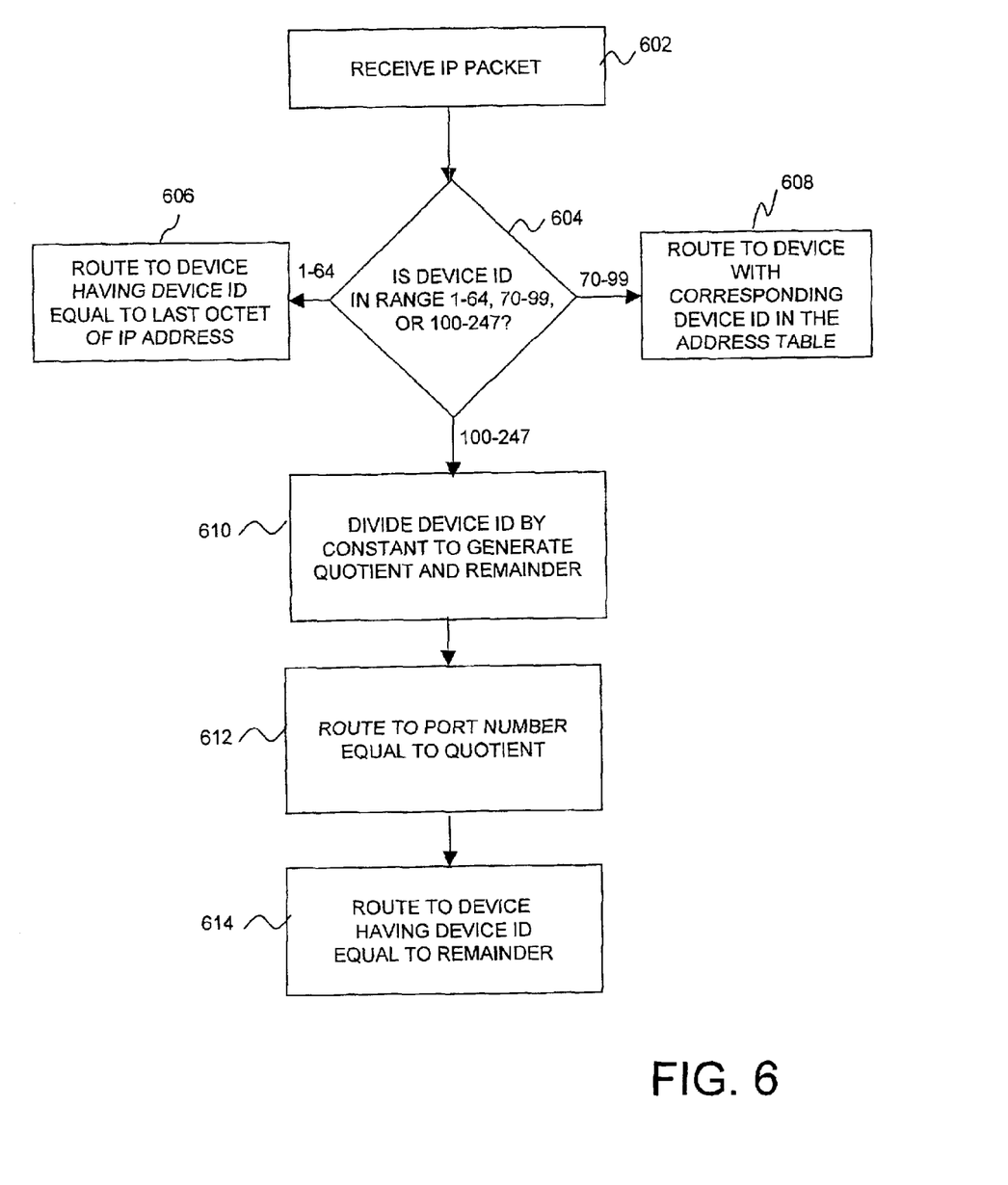
FIG. 6 is a flowchart explaining how MODBUS messages are routed according to different addressing schemes.

FIG. 6 is a flowchart explaining how IP packets are handled by devices that perform a routing function, such as a router, bridge multiplexer 110, or servers 122 and 126, for example. In step 602 the routing device receives an IP packet. In step 604, the routing device opens the MODBUS frame inside of the IP packet and determines whether the device ID is in the range 1–64, 70–99, or 100–247. If, in step 604, the device ID is in the range 1–64, then in step 606 the IP packet is routed to the device having the device ID equal to the last octet of the IP address. If, in step 604, the device ID is determined to be in the range 70–99, then the routing device looks up the device ID in the entry field 404 of the address table 402 and routes the IP packet to the device with the corresponding IP address (in field 406) and device ID (in field 408). For example, if the device ID of the received MODBUS frame is 70, then the routing device looks up the value 70 in the entry field 404 and reads the IP address and device ID from the IP address field 406 and the device ID field 408, respectively. In this case, the device ID of 70 would cause the IP packet to be routed to the device having an IP address of 9.12.14.8 and a device ID of 1, which corresponds to PC 134 in FIG. 1.

If, in step 604, the device ID is in the range 100–247 and the IP packet is received by a subnet gateway, such as bridge multiplexer 110, then in step 610 the subnet gateway divides the device ID by the predetermined constant to generate a quotient and a remainder. Then, in step 612 the subnet gateway routes the embedded MODBUS frame to the port of the subnet gateway having a port number equal to the quotient. Next, in step 614 the MODBUS frame is routed to the device having a subnet address equal to the remainder. For example, referring to FIG. 1, if bridge multiplexer 110 receives a MODBUS frame with a device ID of 102 and the predetermined constant is 100, then bridge multiplexer 110 routes the MODBUS frame to port 1 and then to PLC 112, which has a subnet address of 2.

All or a portion of the invention may be conveniently implemented using conventional general purpose computers or microprocessors programmed according to the teachings of the present invention, as will be apparent to those skilled in the computer art. Appropriate software can be readily prepared by programmers of ordinary skill based on the teachings of the present disclosure, as will be apparent to those skilled in the software art.

FIG. 7 illustrates a computer system 701 upon which an embodiment of the present invention may be implemented. Computer system 701 includes a bus 703 or other communication mechanism for communicating information, and a processor 705 coupled with bus 703 for processing the information. Computer system 701 also includes a main memory 707, such as a random access memory (RAM) or other dynamic storage device (e.g., dynamic RAM (DRAM), static RAM (SRAM), and synchronous DRAM (SDRAM)), coupled to bus 703 for storing information and instructions to be executed by processor 705. In addition, main memory 707 may be used for storing temporary variables or other intermediate information during execution of instructions to be executed by processor 705. The main memory 707 also stores protocol stacks for any communications protocols used by the computer system 701 (e.g., TCP, IP, MODBUS/TCP, Ethernet). Computer system 701 further includes a read only memory (ROM) 709 or other static storage device (e.g., programmable ROM (PROM), erasable PROM (EPROM), and electrically erasable PROM (EEPROM), and flash ROM) coupled to bus 703 for storing static information and instructions for processor 705. A storage device 711, such as a magnetic disk or optical disc, is provided and coupled to bus 703 for storing information and instructions.

The computer system 701 may also include special purpose logic devices (e.g., application specific integrated circuits (ASICs)) or configurable logic devices (e.g., generic array of logic (GAL) or reprogrammable field programmable gate arrays (FPGAs)). Other removable media devices (e.g., a compact disc, a tape, and a removable magneto-optical media) or fixed, high density media drives, may be added to the computer system 701 using an appropriate device bus (e.g., a small computer system interface (SCSI) bus, an enhanced integrated device electronics (IDE) bus, or an ultra-direct memory access (DMA) bus). The computer system 701 may additionally include a compact disc reader, a compact disc reader-writer unit, or a compact disc juke box, each of which may be connected to the same device bus or another device bus.

Computer system 701 may be coupled via bus 703 to a display 713, such as a cathode ray tube (CRT), for displaying information to a computer user. The display 713 may be controlled by a display or graphics card. The computer system includes input devices, such as a keyboard 715 and a cursor control 717, for communicating information and command selections to processor 705. The cursor control 717, for example, is a mouse, a trackball, or cursor direction keys for communicating direction information and command selections to processor 705 and for controlling cursor movement on the display 713.

The computer system 701 performs a portion or all of the processing steps of the invention in response to processor 705 executing one or more sequences of one or more instructions, computer code devices, or computer code mechanisms. Such instructions may be contained and/or read into a memory from another computer readable medium. For example, the instructions may be contained in the storage device 711 and read into the main memory 707. One or more processors in a multi-processing arrangement may also be employed to execute the sequences of instructions contained in main memory 707. In alternative embodiments, hard-wired circuitry may be used in place of or in combination with software instructions. Thus, embodiments are not limited to any specific combination of hardware circuitry and software.

As stated above, the system 701 includes at least one computer readable medium programmed according to the teachings of the invention and for containing data structures, tables, records, or other data described herein. Stored on any one or on a combination of computer readable media, the present invention includes software for controlling the computer system 701, for driving a device or devices for implementing the invention, and for enabling the computer system 701 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention. The computer code devices of the present invention may be any interpreted or executable code mechanisms, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium or media that participate in providing instructions to processor 705 for execution. A computer readable medium may take many forms, including but not limited to, nonvolatile media, volatile media, and transmission media. Non-volatile media includes, for example, optical discs, magnetic disks, and magneto-optical disks, such as storage device 711. Volatile media includes dynamic memory, such as main memory 707. Transmission media includes coaxial cables, copper wire and fiber optics, including the wires that comprise bus 703. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CDROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 705 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 701 may receive the data on the telephone line and use an infrared transmitter to convert the data to an infrared signal. An infrared detector coupled to bus 703 can receive the data carried in the infrared signal and place the data on bus 703. Bus 703 carries the data to main memory 707, from which processor 705 retrieves and executes the instructions. The instructions received by main memory 707 may optionally be stored on storage device 711 either before or after execution by processor 705.

Computer system 701 also includes a communication interface 719 coupled to bus 703. Communication interface 719 provides a two-way data communication coupling to a network link 721 that is connected to a local network (e.g., LAN 723). For example, communication interface 719 may be a network interface card to attach to any packet switched local area network (LAN). As another example, communication interface 719 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 719 sends and receives electrical, electromagnetic, or optical signals that carry digital data streams representing various types of information.

Network link 721 typically provides data communication through one or more networks to other data devices. For example, network link 721 may provide a connection through LAN 723 to a host computer 725, another computer system 701, or to data equipment operated by a service provider, which provides data communication services through an IP (Internet Protocol) network 727 (e.g., the Internet 124). LAN 723 and IP network 727 both use electrical, electromagnetic, or optical signals that carry digital data streams. The signals through the various networks and the signals on network link 721 and through communication interface 719, which carry the digital data to and from computer system 701, are exemplary forms of carrier waves transporting the information. Computer system 701 can transmit notifications and receive data, including program code, through the network(s), network link 721 and communication interface 719.

Obviously, numerous modifications and variations of the present invention are possible in light of the above teachings. It is therefore to be understood that within the scope of the appended claims, the invention may be practiced otherwise than as specifically described herein.

I claim:

1. A method for communicating information over a communications network, comprising:

determining a network location of a target device to which a first frame of information is to be sent, the first frame of information being formatted for a first communications protocol and including a device address field configured to store a device identifier;

selecting, based on the network location of the target device, an addressing scheme from among plural different addressing schemes;

generating the device identifier for the first frame on the basis of the selected addressing scheme, the device identifier corresponding to the target device;

encapsulating the first frame of information in a second frame of information formatted for a second communications protocol, the second frame including a destination address field;

generating a destination address for the second frame on the basis of the device identifier in the device address field of the first frame;

storing the destination address in the destination address field of the second frame; and transmitting the second frame of information over the communications network.

2. The method of claim 1, wherein the first frame of information comprises a MODBUS frame, and the second frame of information comprises an IP packet that encapsulates a TCP frame encapsulating the MODBUS frame.

3. The method of claim 1, further comprising encapsulating the second frame in an Ethernet frame prior to transmitting the second frame.

4. The method of claim 1, wherein the step of determining the network location comprises determining that the target device is on a local network; and wherein the step of generating the destination address comprises substituting the device identifier for at least a portion of the destination address in the destination address field.

5. The method of claim 1, wherein the step of determining the network location comprises determining that the target device is coupled to a subnet gateway of a subnet, the target device being identified on the subnet by a subnet identifier corresponding to the target device and by a port identifier corresponding to a port of the subnet gateway; and wherein the step of generating the device identifier comprises adding the subnet identifier to the product of the port identifier and a predetermined constant.

6. The method of claim 5, further comprising:

receiving the second frame at the subnet gateway;

dividing the device identifier by the predetermined constant to generate a quotient and a remainder;

determining the port identifier from the quotient;

determining the subnet identifier from the remainder; and routing the first frame to the target device based on the port identifier and the subnet identifier.

7. The method of claim 1, wherein the step of determining the network location comprises determining that the target device is on a remote network; and wherein the step of generating the device identifier comprises determining the device identifier from an address table entry that uniquely identifies the target device.

8. The method of claim 1, wherein the device identifier has a numeric value in one of plural ranges, each of the plural ranges corresponding to one of the plural addressing schemes.

9. The method of claim 1, wherein the step of determining comprises determining if the target device is (a) on a local network and not on a subnet, (b) on a remote network, or (c) is on a local subnet, the target device being identified on the subnet by a subnet identifier corresponding to the target device and by a port identifier corresponding to a port of a subnet gateway, the port coupling the target device to the subnet gateway;

wherein the step of generating the device identifier comprises:

adding the subnet identifier to the product of the port identifier and a predetermined constant, if the target device is on the subnet; and determining the device identifier from an address table entry that uniquely identifies the destination address and the target device, if the target device is on the remote network; and wherein the step of generating the destination address comprises substituting the device identifier for at least a portion of the destination address in the destination address field, if the target device is on the local network and not on the subnet.

10. A computer readable medium containing program instructions for execution on a computer system, which when executed by the computer system, cause the computer system to perform the method steps for communicating information over a communications network, said method comprising the steps of:

determining a network location of a target device to which a first frame of information is to be sent, the first frame of information being formatted for a first communications protocol and including a device address field configured to store a device identifier;

selecting, based on the network location of the target device, an addressing scheme from among plural different addressing schemes;

generating the device identifier for the first frame on the basis of the selected addressing scheme, the device identifier corresponding to the target device;

encapsulating the first frame of information in a second frame of information formatted for a second communications protocol, the second frame including a destination address field;

generating a destination address for the second frame on the basis of the device identifier in the device address field of the first frame;

storing the destination address in the destination address field of the second frame; and transmitting the second frame of information over the communications network.

11. The computer readable medium of claim 10, wherein the first frame of information comprises a MODBUS frame, and the second frame of information comprises an IP packet that encapsulates a TCP frame encapsulating the MODBUS frame.

12. The computer readable medium of claim 10, wherein the computer readable medium further comprises the step of encapsulating the second frame in an Ethernet frame prior to transmitting the second frame.

13. The computer readable medium of claim 10, wherein the step of determining the network location comprises determining that the target device is on a local network; and wherein the step of generating the destination address comprises substituting the device identifier for at least a portion of the destination address in the destination address field.

14. The computer readable medium of claim 10, wherein the step of determining the network location comprises determining that the target device is coupled to a subnet gateway of a subnet, the target device being identified on the subnet by a subnet identifier corresponding to the target device and by a port identifier corresponding to a port of the subnet gateway; and wherein the step of generating the device identifier comprises adding the subnet identifier to the product of the port identifier and a predetermined constant.

15. The computer readable medium of claim 14, wherein the computer readable medium further comprises the step of:

receiving the second frame at the subnet gateway;

dividing the device identifier by the predetermined constant to generate a quotient and a remainder;

determining the port identifier from the quotient;

determining the subnet identifier from the remainder; and routing the first frame to the target device based on the port identifier and the subnet identifier.

16. The computer readable medium of claim 10, wherein the step of determining the network location comprises determining that the target device is on a remote network; and wherein the step of generating the device identifier comprises determining the device identifier from an address table entry that uniquely identifies the target device.

17. The computer readable medium of claim 10, wherein the device identifier has a numeric value in one of plural ranges, each of the plural ranges corresponding to one of the plural addressing schemes.

18. The computer readable medium of claim 10, wherein the step of determining comprises determining if the target device is (a) on a local network and not on a subnet, (b) on a remote network, or (c) is on a local subnet, the target device being identified on the subnet by a subnet identifier corresponding to the target device and by a port identifier corresponding to a port of a subnet gateway, the port coupling the target device to the subnet gateway;

wherein the step of generating the device identifier comprises:

adding the subnet identifier to the product of the port identifier and a predetermined constant, if the target device is on the subnet; and determining the device identifier from an address table entry that uniquely identifies the destination address and the target device, if the target device is on the remote network; and wherein the step of generating the destination address comprises substituting the device identifier for at least a portion of the destination address in the destination address field, if the target device is on the local network and not on the subnet.

19. A system for communicating information over a communications network, comprising:

means for determining a network location of a target device to which a first frame of information is to be sent, the first frame of information being formatted for a first communications protocol and including a device address field configured to store a device identifier;

means for selecting, based on the network location of the target device, an addressing scheme from among plural different addressing schemes;

means for generating the device identifier for the first frame on the basis of the selected addressing scheme, the device identifier corresponding to the target device;

means for encapsulating the first frame of information in a second frame of information formatted for a second communications protocol, the second frame including a destination address field;

means for generating a destination address for the second frame on the basis of the device identifier in the device address field of the first frame;

means for storing the destination address in the destination address field of the second frame; and means for transmitting the second frame of information over the communications network.

20. The system of claim 19, wherein the first frame of information comprises a MODBUS frame, and the second frame of information comprises an IP packet that encapsulates a TCP frame encapsulating the MODBUS frame.

21. The system of claim 19, further comprising encapsulating the second frame in an Ethernet frame prior to transmitting the second frame.

22. The system of claim 19, wherein the means for determining the network location comprises means for determining that the target device is on a local network; and wherein the means for generating the destination address comprises means for substituting the device identifier for at least a portion of the destination address in the destination address field.

23. The system of claim 19, wherein the means for determining the network location comprises means for determining that the target device is coupled to a subnet gateway of a subnet, the target device being identified on the subnet by a subnet identifier corresponding to the target device and by a port identifier corresponding to a port of the subnet gateway; and wherein the means for generating the device identifier comprises means for adding the subnet identifier to the product of the port identifier and a predetermined constant.

24. The system of claim 23, further comprising:

means for receiving the second frame at the subnet gateway;

means for dividing the device identifier by the predetermined constant to generate a quotient and a remainder;

means for determining the port identifier from the quotient;

means for determining the subnet identifier from the remainder; and means for routing the first frame to the target device based on the port identifier and the subnet identifier.

25. The system of claim 23, wherein the subnet gateway comprises a bridge multiplexer.

26. The system of claim 19, wherein the means for determining the network location comprises means for determining that the target device is on a remote network; and wherein the means for generating the device identifier comprises means for determining the device identifier from an address table entry that uniquely identifies the target device.

27. The system of claim 19, wherein the device identifier has a numeric value in one of plural ranges, each of the plural ranges corresponding to one of the plural addressing schemes.

28. The system of claim 19, wherein the target device is a programmable logic controller and the system further comprises the programmable logic controller.

29. The system of claim 19, wherein means for determining comprises means for determining if the target device is (a) on a local network and not on a subnet, (b) on a remote network, or (c) is on a local subnet, the target device being identified on the subnet by a subnet identifier corresponding to the target device and by a port identifier corresponding to a port of a subnet gateway, the port coupling the target device to the subnet gateway;

wherein the means for generating the device identifier comprises:

means for adding the subnet identifier to the product of the port identifier and a predetermined constant, if the target device is on the subnet; and means for determining the device identifier from an address table entry that uniquely identifies the destination address and the target device, if the target device is on the remote network; and wherein the means for generating the destination address comprises means for substituting the device identifier for at least a portion of the destination address in the destination address field, if the target device is on the local network and not on the subnet.

30. A system for communicating information over a communications network, comprising:

a memory having embodied therein information of the communications network and network protocols;

a processor in communication with the memory and configured to:

determine a network location of a target device to which a first frame of information is to be sent, the first frame of information being formatted for a first communications protocol and including a device address field configured to store a device identifier;

select, based on the network location of the target device, an addressing scheme from among plural different addressing schemes;

generate the device identifier for the first frame on the basis of the selected addressing scheme, the device identifier corresponding to the target device;

encapsulate the first frame of information in a second frame of information formatted for a second communications protocol, the second frame including a destination address field;

generate a destination address for the second frame on the basis of the device identifier in the device address field of the first frame;

store the destination address in the destination address field of the second frame; and transmitting the second frame of information over the communications network.

31. The system of claim 30, wherein the first frame of information comprises a MODBUS frame, and the second frame of information comprises an IP packet that encapsulates a TCP frame encapsulating the MODBUS frame.

32. The system of claim 30, further comprising encapsulating the second frame in an Ethernet frame prior to transmitting the second frame.

33. The system of claim 30, wherein the processor is further configured to substitute the device identifier for at least a portion of the destination address in the destination address field when the target device is on a local network.

34. The system of claim 30, wherein, the processor is configured to generate the device identifier by adding a subnet identifier to the product of a port identifier and a predetermined constant when the target device is coupled to a subnet gateway of a subnet, the target device being identified on the subnet by the subnet identifier and by the port identifier, the subnet identifier corresponding to the subnet and the port identifier corresponding to a port of the subnet gateway.

35. The system of claim 34, wherein the system further comprises the subnet gateway and the subnet gateway is configured to:
   receive the second frame at the subnet gateway;
   divide the device identifier by the predetermined constant to generate a quotient and a remainder;
   determine the port identifier from the quotient;
   determine the subnet identifier from the remainder; and
   rout the first frame to the target device based on the port identifier and the subnet identifier.

36. The system of claim 34, wherein the system further comprises the subnet gateway and the subnet gateway comprises a bridge multiplexer.

37. The system of claim 30, wherein the processor is further configured to determining the device identifier from an address table entry that uniquely identifies the target device when the target device is on a remote network.

38. The system of claim 30, wherein the device identifier has a numeric value in one of plural ranges, each of the plural ranges corresponding to one of the plural addressing schemes.

39. The system of claim 30, wherein the system further comprises the target device and the target device comprises a programmable logic controller.

40. The system of claim 30, wherein the processor is further configured to:
   determine if the target device is (a) on a local network and not on a subnet, (b) on a remote network, or (c) is on a local subnet, the target device being identified on the subnet by a subnet identifier corresponding to the target device and by a port identifier corresponding to a port of a subnet gateway, the port coupling the target device to the subnet gateway;
   add the subnet identifier to the product of the port identifier and a predetermined constant, if the target device is on the subnet;
   determine the device identifier from an address table entry that uniquely identifies the destination address and the target device, if the target device is on the remote network; and
   generate the destination address by substituting the device identifier for at least a portion of the destination address in the destination address field, if the target device is on the local network and not on the subnet.

* * * * *